United States Patent [19]
Brown et al.

[11] Patent Number: 5,123,302
[45] Date of Patent: Jun. 23, 1992

[54] AUTOMATIC TRANSMISSION GEARSHIFT CONTROL HAVING FEEDFORWARD RESPONSE OF CLUTCH AND ITS HYDRAULIC ACTUATION

[75] Inventors: Larry T. Brown; Lee-Fei Chen; Davorin D. Hrovat, all of Dearborn, Mich.

[73] Assignee: Ford Motor Company, Dearborn, Mich.

[21] Appl. No.: 632,712

[22] Filed: Dec. 24, 1990

[51] Int. Cl.$^5$ .............................................. B60K 41/04
[52] U.S. Cl. .................... 74/866; 192/0.032; 364/424.1
[58] Field of Search ............... 192/0.032, 0.076, 0.092, 192/0.096, 3.58, 103 R, 103 F; 74/866; 364/424.1

[56] References Cited

U.S. PATENT DOCUMENTS

| | | | |
|---|---|---|---|
| 4,503,734 | 3/1985 | Acker | 74/866 |
| 4,527,678 | 7/1985 | Pierce et al. | 192/3.58 |
| 4,757,886 | 7/1988 | Brown et al. | 192/3.3 |
| 4,790,418 | 12/1988 | Brown et al. | 192/0.032 |
| 4,792,902 | 12/1988 | Hrovat et al. | 364/424.1 |
| 4,799,158 | 1/1989 | Patil | 364/424.1 |
| 4,821,190 | 4/1989 | Patil | 364/424.1 |
| 4,868,753 | 9/1989 | Mori | 364/424.1 |
| 4,953,090 | 8/1990 | Narita | 364/424.1 |
| 4,969,098 | 11/1990 | Leising et al. | 364/424.1 |
| 4,998,200 | 3/1991 | Glowczewski et al. | 364/424.1 |
| 5,020,391 | 6/1991 | Aoki et al. | 74/866 |
| 5,046,174 | 9/1991 | Lentz et al. | 364/424.1 |

Primary Examiner—Richard Lorence
Attorney, Agent, or Firm—Frank G. McKenzie; Roger L. May

[57] ABSTRACT

In a powertrain including an engine controlled by the position of the throttle valve, a hydrodynamic torque converter and multiple ratio automatic transmission connected to the drive wheels of the vehicle, a solenoid-operated hydraulic valve supplies pressurized fluid to engage and release the clutch that controls torque transfer between an offgoing clutch and an oncoming clutch. The position of the throttle valve and the speed of the engine are applied as input to a mathematical model programmed in algorithmic form for execution by a digital microprocessor. The engine produces a signal representing net torque output by the engine and torque converter, which signal is applied as input to an inverse mathematical model of the solenoid-operated valve that supplies hydraulic fluid to the controlling clutch. The unique relationship of phase to gain, the frequency response of the solenoid valve, is inverted within the frequency range of interest to remove the effects of delay. Torque converter turbine speed error is determined as it is applied as input to a PID compensated feedback control, whose output is summed with the inverse of the solenoid valve frequency response to produce a duty cycle supplied to the solenoid that controls pressure in the transmission friction element.

13 Claims, 3 Drawing Sheets

AUTOMATIC TRANSMISSION GEARSHIFT CONTROL HAVING FEEDFORWARD RESPONSE OF CLUTCH AND ITS HYDRAULIC ACTUATION

BACKGROUND OF THE INVENTION

1. Field of the Invention

This invention pertains to the field of gearshift controls for automatic transmissions. More particularly, it pertains to a system for controlling operation of solenoid-operated valves that supply pressurized hydraulic fluid to clutches in the transmission. Engagement and release of the clutches cause the gearset to change the operating gear ratio. A feedforward control uses a net engine torque signal and the inverse frequency response to commanded engine torque of the solenoid valve and the associated transmission clutch.

2. Description of the Prior Art

U.S. Pat. No. 4,757,886 describes a closed loop control system for controlling operation of a transmission bypass clutch Particularly on the basis of slip across the torque converter. The system employs measured slip as a feedback signal combined with a command signal to produce a slip error. Thereafter, a duty cycle correction formed on the basis of the difference between duty cycles in the current sampling period and the previous sampling period is developed and processed to produce a clutch pressure signal used to vary slip and as feedback to enhance stability of the duty cycle error signal.

U.S. Pat. No. 4,790,418 describes a technique for controlling the transfer of torque from an offgoing friction element to an oncoming friction element when a gear ratio change is being made in an automatic transmission. Slip across the offgoing clutch is used to control engine speed. Time rate of change of torque in the offgoing clutch is used as a basis to change clutch pressure in accordance with a calculated torque slope.

U.S. Pat. No. 4,792,902 describes a system and a method for controlling the ignition timing of an internal combustion engine in a driveline that includes a multiple speed ratio transmission. Spark timing of the engine is advanced and retarded on the basis of engine speed and transmission output speed by a control algorithm whose execution improves the gear ratio changes. None of these patents describes a feedforward technique for controlling the friction element of an automatic transmission.

When a gear ratio change occurs in an automatic transmission, the variation of the speed ratio output by the transmission with time is characterized by two phases, a torque phase and an inertia phase. During the torque phase, torque produced by the engine is exchanged between an offgoing friction element and an oncoming friction element so that, when these elements are fully engaged and fully released, the speed ratio of the transmission associated with the gear ratio at the end of the gearshift results. During the inertia phase of an upshift, the oncoming friction element controls the speed of the transmission input shaft to a new lower value corresponding to the gear ratio after the shift is completed. This effectively controls the speed ratio produced by the transmission because, over the short duration of a gear shift, the speed of the transmission output shaft is constant.

The strongest disturbance influencing this transfer of torque occurs when a change of engine torque is demanded by the vehicle operator when changing the position of the throttle valve by depressing or releasing the accelerator pedal. The effects of these disturbances are particularly acute and significant when the driver's manual control of the accelerator pedal is inconsistent with previous action that initiated the gear ratio change. For example, if during the inertia phase, the driver suddenly depresses the accelerator pedal, engine torque increases, thereby causing more slip across the oncoming friction element. This action causes reduction in fuel economy, losses associated with inefficient operation of the torque converter, and excessive wear of the friction element. If during the inertia phase, the accelerator pedal is suddenly released, potential for friction element to lock or to slip only slightly, leads to unacceptable noise, vibration and harshness.

SUMMARY OF THE INVENTION

To overcome these undesirable disturbances, the control system of the present invention employs feedback and feedforward control. The feedback control employs an algorithm suitable for execution by a microprocessor onboard the vehicle and adapted to produce PID compensation or comparable modern compensation. The PID controller can be further augmented by lead-lag as required.

The feedforward control based on the throttle angle position and engine speed is added to the feedback controller output to counteract disturbance caused by the driver's manual manipulation of the engine throttle valve. The feedforward controller produces an estimate of the net engine torque that would result when the throttle angle is changed by operator action. An estimate is based on a dynamic engine model operating on the basis of throttle position and engine speed to produce net engine torque. If a torque converter is employed in the powertrain, any torque amplification associated with the torque converter as well as a phase shift associated with delays inherent in the torque converter operation are accounted for by a model of that component in the control system.

Torque Produced by the algorithms is then passed through a dynamic term approximating the inverse frequency of response of the solenoid, the hydraulic valve it controls, and the associated friction element. Engine torque is produced in the form of an output duty cycle. However, it has been discovered, that better feedforward action results by passing the torque value through a low-pass filtered inverse of a solenoid-operated valve model representing operation of the solenoid, the hydraulic valve it operates and the associated friction element. Ideally, this control reduces the slip transient to zero or in practice to a very small value. The control can be adapted to substitute manifold absolute pressure MAP or mass air flow MAF for throttle angle position to obtain the estimated engine torque.

DESCRIPTION OF THE PREFERRED EMBODIMENT

Figure 1:
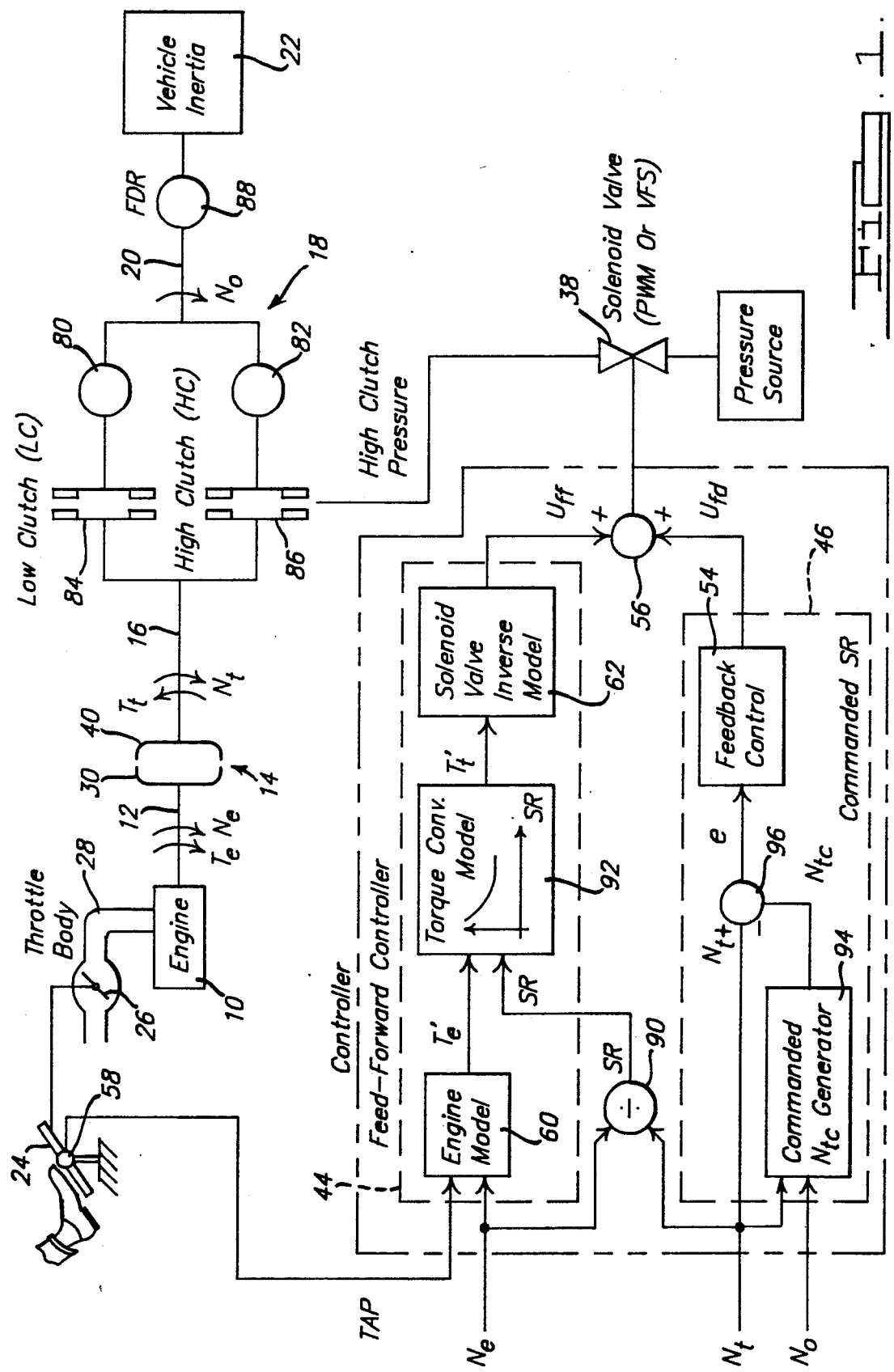
FIG. 1 is a schematic diagram showing a powertrain containing an engine and a multiple speed ratio automatic transmission, operation of the friction elements of the transmission being suited for control by the system of the present invention.

FIG. 1 shows the components of an automotive vehicle powertrain to which the closed loop control of the present invention can be applied. An internal combustion engine 10 is drivably connected through an engine crankshaft 12 to a torque converter 14, which is connected by a turbine shaft or transmission input shaft 16 to the transmission gear box 18 input. The transmission contains multiple speed ratio gearsets, clutches, brakes, a hydraulic control system, solenoid-operated shift valves, a microprocessor, and sensors producing signals representing shaft speeds, throttle position and other operating variables. The gearbox is connected through the transmission output shaft 20 to the drive wheels of the vehicle. Vehicle inertia 22 is the principal load driven by the powertrain.

The vehicle operator controls the position of an accelerator pedal 24, whose movement changes the position of the throttle valve 26 located in the engine intake manifold. The torque produced by the engine (Te) and the engine speed (Ne) are carried on engine shaft 12 to the torque converter impeller 30. The impeller drives the turbine hydrodynamically as the impeller and turbine rotate about the axis of the torque converter 30 through hydraulic fluid contained in a casing continually supplied with fluid from the hydraulic circuit. The circuit includes a pump or pressure source for pressurizing the hydraulic circuit and the various clutches and brakes of the transmission control system, the lubrication system of the transmission gearbox, and the torque converter itself.

The transmission 18 includes a first gearset 80 for producing a relatively low gear ratio, a second gearset 82 producing a higher gear ratio, a friction element clutch 84 for drivably connecting and releasing turbine shaft 16 and gearset 80 and a second friction element of a high ratio clutch 86 for connecting and releasing the turbine shaft and the input to gearset 82. The transmission output shaft 20, whose speed is $N_o$ is drivably connected to a final drive gear ratio, whose magnitude is affected by elements of the transmission output, the axle differential and the radius of the drive wheels.

The control contains a module 94, which acquires access to data memory where discrete speed ratios associated with each of the gear ratios of the transmission are stored in the form of constants. When the transmission output shaft speed is received as input to this model, multiplication by the gearset ratio corresponding to the current operating gear ratio produces as output, a commanded turbine speed $N_{tc}$. The current turbine speed and commanded turbine speed Nt are combined at summing junction 96 where a turbine speed error signal is produced and supplied as input to a proportional, integral, differential PID feedback control 54.

The controller for controlling operation of the solenoid valve includes a feedforward control portion 44 and a feedback control portion 46. A sensor 58 produces a signal representing the position of the accelerator pedal or throttle valve, the extent to which throttle valve opens the engine intake manifold. The signal, throttle angular position TAP or the intake manifold pressure MAP downstream from the throttle valve 26, is applied as input to the engine and torque converter mathematic model 60. This model produces an output signal (Te'), net engine torque, which is applied as input to torque converter model 92. The output $T_t'$ to solenoid valve inverse model 62. The output $U_{ff}$ from model 62 is combined at summing junction 56 with the output $U_{fd}$ from the PID control 54 to produce a pulse width modulated PWM duty cycle or an analog current for a variable force solenoid VFS, if used. The signal applied to the solenoid operates a hydraulic valve 38, which opens and closes communication between the pressure source and low clutch 84 or high clutch 86, whichever clutch controls the speed ratio during the speed ratio change. The valve produces a control pressure in accordance with the magnitude of the duty cycle or current, thereby controlling the transfer of torque from the off-going clutch to the oncoming clutch as the controlling clutch is engaged or disengaged.

Figures 2, 3:
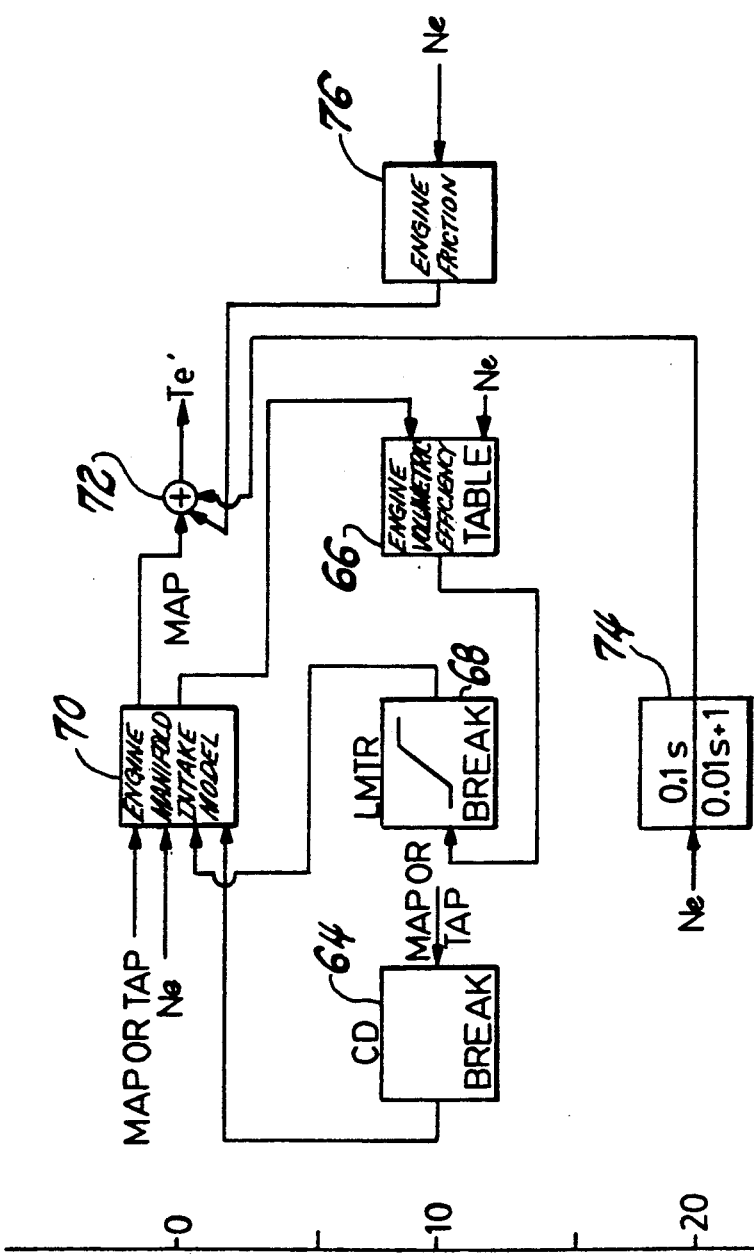
FIG. 2 is a diagram representing a mathematical engine model, a component of the feedback system of FIG. 1.
FIG. 3 shows the response of the net engine torque to a step throttle position disturbance.

FIG. 2 shows logic elements of the engine model that produces the output signal $T'_e$. Input signals representing throttle angle position TAP or MAP or mass air flow MAF and $N_i$ are applied as input together with coefficient of discharge (CD), a variable representing a measure of pressure drop across the throttle plate of the intake manifold. The value for coefficient of discharge is produced by element 64 in accordance with a predetermined relationship when TAP is known.

Inputs to engine manifold and intake block 70 are throttle position TAP or MAP or MAF, engine speed Ne, volumetric efficiency and coefficient CD.

Input signals representing engine speed Ne and MAP are supplied as input to element 66, which produces engine volumetric efficiency as output. The volumetric efficiency is derived on the basis of engine empirical data. A signal representing this output value is applied as input to a limiter 68 to produce a linearly variable range of output signals, which also limit the engine volumetric efficiency to physically realizable values between zero and unity. Output from limiter 68 is also applied to engine manifold intake model 70. On the basis of these input variables, engine manifold intake model 70 produces a signal representing gross engine torque, representing the delay response between an abrupt change in throttle input shown in FIG. 3 and accounting for the time constant that controls response to the engine to a value of torque converter load torque commensurate with the change in throttle position. Engine model 70 produces an engine torque output signal having a phase shift $e^{-ts}$ and transient response of engine torque to throttle position and engine speed. FIG. 3 shows graphically the phase delay and rise time of the response to an abrupt change in throttle position.

The output signal from model 70, which is the combustion torque, is applied to summing junction 72 However, account is also taken at summing junction 72 for a reduction of engine output torque due to engine rotating inertia. A portion 74 of the engine model of FIG. 2 includes a transfer function relating the first time derivative of engine speed and engine inertia to torque associated with overcoming engine inertia. Control block 76 produces a signal representing a reduction in engine torque due to friction loss.

The outputs from control elements 70, 74 and 76 are combined at summing junction 72 where the net engine torque Te' signal having the characteristic response including phase delay and time constant effect on the actual engine torque response to throttle position disturbance.

A difference equation implemented in software for the PID compensator 54 is:

$$U_{fd}(K) = K_c U_{fd}(k)$$

$$U_{fd} = U_{fd}(k-1) + K_p[e(K) - e(k-1)] + K_i e(k) + K_d[e(k) - 2e(k-1) + e(k-2)]$$

where Kc is the overall control gain $e(k) = N_t - N_t(k)$ is the turbine speed error at sampling instant k; $N_{tc}(k)$ is commanded turbine speed at sampling instant k; Nt(k) is turbine speed at sampling instant k; k−1 refers to the immediately preceding sampling instant; k−2 is the sample that precedes the immediately preceding sampling; and Kp, Kd and Ki are proportional, derivative, and integral gains, respectively.

The speed ratio of the torque converter is calculated at 90 where engine speed is divided by turbine speed. The engine torque signal Te' produced by the dynamic engine model 60 and the torque converter speed ratio SR are applied as input to a portion 92 of the feedforward control 44 that contains both the static and dynamic characteristics of the torque converter. For example, the static characteristic is represented by a K curve of the torque converter, which produces its torque amplification factor from the K curve function stored in computer memory with reference to torque converter speed ratio. If needed, the dynamic characteristic of the torque converter is represented by a phase shift resulting from an input torque converter command and a response to that command. This phase shift may be represented in a form of a low pass filter having the response characteristics of the torque converter. If a torque converter is present in the powertrain, an algorithm represented by the module 92 amplifies net engine torque output by the engine model 60 in accordance with the current operating torque converter speed ratio. The output signal produced Tt' represents torque carried by turbine shaft 16, the input to the transmission.

The model represented by block 62 contains a transfer function relating turbine torque to the inverse of a clutch pressure relationship produced as output by valve 38. The output signal $U_{ff}$ is related to the engine torque input by an inverse model representing operation of solenoid valve 38, the related hydraulic components for actuating the clutch 86 and the clutch itself. The inverse model 62 relates its output signal, the solenoid voltage or a PWM duty cycle, Uff, to the transmission torque $T_t'$ required to counteract the effects of throttle disturbance on speed ratio. The inverse model can be determined analytically or experimentally such as by the techniques described with reference to FIG. 4. For example, in the case of linear solenoid models the output is a frequency response Containing dynamic characteristics such as phase shift transient, rise time, overshoot, and transient duration. The frequency response is produced by a Fast Fourier Transform FFT analyzer 80, such as that produced by Hewlett Packard Corporation, illustrated in and described with reference to FIG. 4.

To establish the inverse frequency response, the solenoid, the hydraulic valve 38 operated by the solenoid, and clutch 84 or 86 are tested on a dynamometer. Pressure present within the clutch causes a pressure transducer 79 to produce a feedback signal to the FFD analyzer 81. A mixed frequency signal in the form of input noise is supplied to the solenoid. Output in analog form produced by the analyzer passes through A-to-D converter 87 to produce a signals 89 applied as input to the solenoid when a PWM signal is employed. If the solenoid is a variable force solenoid, a mixed frequency analog current is supplied to the solenoid. The analyzer contains a plotter 91 that shows the unique gain and phase relationship of the pressure within clutch 84 or 86 over the frequency range of the signal applied to the solenoid.

Figure 4:
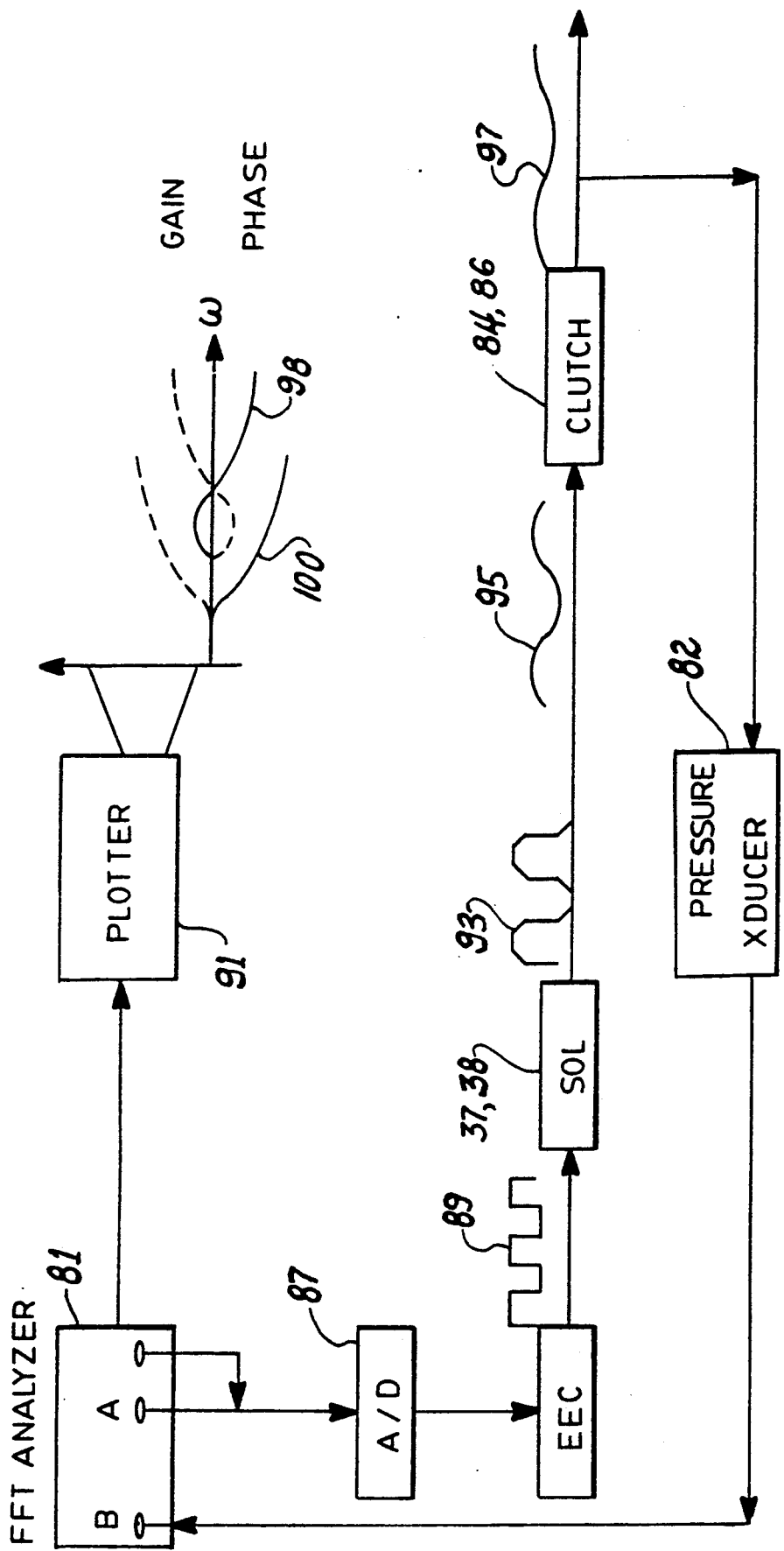
FIG. 4 is a schematic diagram showing the arrangement for determining the inverse frequency response of a solenoid valve and related hydraulics in the control system of this invention.

In FIG. 4, waveforms representing the on-off state of the solenoid are represented at 93, pressure output by the hydraulic valve at 95, and pressure within clutch 84 at 97. The gain 98 and phase of the response produced by the analyzer 80 in the form of a transfer function are inverted with appropriate low pass filter augmentation in the band width of interest of up to 10 Hz to produce an output from model 62 in response to the net engine torque signal Te'. This inversion is done to anticipate the engine dynamics including the induction-to-power delay so that clutch pressure signal applied at summing junction 56 is in phase with the engine torque signal, the signal applied as output from engine 10. Therefore, delay in response of the clutch pressure to an engine torque disturbance is avoided because the control signal applied to the solenoid leads the control pressure response by an equivalent of the engine delay period. Instead of using the above experimentally obtained inverse transfer function, it is possible to use a low pass filtered inverse of the non-linear system model.

The duty cycle or analog current produced as output by the solenoid valve inverse model 62 $u_{ff}$ and the duty cycle produced by feedback control 54 $u_{fd}$ are combined at summing junction 56 to produce a net duty cycle, which is applied to solenoid valve 38 if a pulse width modulated mode of operation of the solenoid valve is used. However, if a variable force solenoid VFS is used instead of the PWM solenoid, the duty cycle is converted to an analog current and then the current is supplied to the solenoid-controlled hydraulic valve 38. The valve is supplied with fluid from a pressure source such as a pump whose output is opened and closed in response to operation of the solenoid to supply pressure at a variable magnitude to the high ratio clutch 86 and the low ratio clutch 84.

In a transmission having gearsets that produce discrete gear ratios, the friction element that controls the speed ratio for an upshift is the oncoming friction element, clutch 86. When a downshift is occurring, the friction element that controls the speed ratio of the transmission is the offgoing friction element, clutch 84. If, however, the transmission has a speed ratio between the gear ratios produced by gearsets 80 and 82 and a friction element associated with that intermediate gear ratio, the controlling friction element for an upshift from the lowest gear ratio is the clutch associated with the intermediate gear ratio, and the friction element that controls the speed ratio of the transmission during a downshift from the highest gear ratio to the intermediate gear ratio is clutch 86.

Having described the preferred embodiment of our invention, what we claim and desire to secure by U.S. Letters Patent is:

1. A system for controlling speed ratio changes in an automatic transmission adapted for connection to an engine controlled by a variable position throttle, comprising:
   a friction element whose degree of engagement and release selectively produces a change in operating speed ratio of said transmission in response to a variable hydraulic pressure;

a source of hydraulic pressure;

an electrical solenoid-operated valve opening and closing communication between the pressure source and the friction element, for producing pressure of variable magnitude in the friction element in response to a control signal applied to the solenoid;

means for producing a signal representing throttle position;

means for producing a signal representing actual transmission input speed;

means for producing a signal representing commanded transmission input speed;

means for comparing actual and commanded transmission input speeds and producing an error signal from said comparison;

feedback control means supplied with said error signal representing the difference between commanded transmission input speed and actual transmission input speed for producing a first control signal; and feedforward control means supplied with a signals representing engine speed and throttle position for producing a second control signal whose phase and gain are inverted in relation to the phase and gain of the friction element pressure response to a signal applied to the solenoid;

means for summing the first and second control signals and producing a corrected control signal therefrom; and means for actuating the friction element by supplying said corrected control signal to the solenoid.

2. The system of claim 1 wherein the feedback control means includes compensator means for phase compensating the speed error duty cycle including a proportional, integral, differential compensator.

3. The system of claim 1 wherein the friction element supplied with pressure from the solenoid operated valve is the friction element whose state of engagement and disengagement determines the speed ratio produced by the transmission.

4. The system of claim 1 further comprising multiple friction elements whose state of engagement and disengagement determines a high speed ratio and a low speed ratio and wherein the friction element supplied with pressure from the solenoid operated valve is the friction element whose state determines the speed ratio produced by the transmission.

5. The system of claim 4 wherein the friction element during a downshift is the friction element in which torque is reduced by the speed ratio change, and during an upshift is the friction element in which torque is increased by the speed ratio change.

6. The system of claim 1 wherein the signal representing throttle position may be replaced with any of the group consisting of throttle angle position, mass air flow, or manifold absolute pressure.

7. A system for controlling speed ratio changes in an automatic transmission adapted for connection to an engine controlled by a variable position throttle, comprising:

a friction element whose engagement and release selectively produces a change in operating speed ratio of said transmission;

a source of hydraulic pressure;

an electrical solenoid-operated valve opening and closing communication between the pressure source and the friction element, for producing pressure of variable magnitude in the friction element in response to control signals applied to the solenoid;

means for producing a signal representing throttle position;

means for producing a signal representing actual transmission input speed;

means for producing a signal representing commanded transmission input speed;

means for comparing actual and commanded transmission input speeds and producing an error signal from said comparison;

feedback control means supplied with said error signal representing the difference between commanded transmission input speed and actual transmission input speed for producing a first control signal;

feedforward control means that accounts for the transient response of the engine, transmission, friction element and solenoid-operated valve to a change in engine torque, responsive to signals representing throttle position and engine speed for producing a second control signal whose phase and gain are inverted in relation to the phase and gain of the friction element pressure in response to a signal applied to the solenoid, including means responsive to the signals representing throttle position and engine speed for producing a signal representing engine torque and means responsive to the engine torque signal for producing a signal representing transmission input torque;

means for summing the first and second control signals and producing a corrected control signal therefrom;

means for actuating the friction element by supplying said corrected control signal to the solenoid.

8. The system of claim 7 further comprising engine torque signal producing means comprising:

means responsive to engine speed and pressure in the engine manifold downstream from the engine throttle for producing a signal representing the volumetric efficiency of the engine;

means responsive to throttle position for producing a signal representing fluid pressure drop across the engine throttle; and means responsive to the throttle position signal, engine speed signal, pressure drop signal, and efficiency signal for producing a signal representing engine torque.

9. The system of claim 7 further comprising:

means containing a transfer function relating engine speed and torque associated with overcoming engine inertia, responsive to the engine speed signal for producing a signal representing torque associated with engine inertia;

summing means for combining the signal representing engine torque and the signal representing torque associated with engine inertia for producing a signal representing the static and dynamic response of the engine to a change in throttle position and engine speed.

10. The system of claim 7 further comprising means relating engine speed to torque associated with overcomming engine friction, responsive to the engine speed signal for producing a signal representing torque associated with engine friction loss;

summing means for combining the signal representing engine torque, the signal representing torque associated with engine friction loss and the signal representing torque associated with engine inertia for producing a signal representing the static and dynamic response of the engine to a change in throttle position and engine speed.

11. The system of claim 7 wherein the signal representing throttle position may be replaced by any of the group consisting of throttle angle position, mass air flow, or manifold absolute pressure.

12. A method for controlling speed ratio changes in an automatic transmission having a friction element adapted for connection to an engine controlled by a variable position throttle, the transmission having a torque converter having an impeller adapted for connection to the engine, a turbine adapted for hydrokenetic connection to the impeller, and an electrical solenoid-operated valve communicating with the friction element, comprising the steps of:

producing pressure of variable magnitude in the friction element by opening and closing communication between a source of hydraulic pressure and the friction element in response to a signal applied to the solenoid, the friction element pressure response having a phase and gain relation to the phase and gain of said signal;

producing a signal representing throttle position;

producing a signal representing transmission actual input speed;

producing a signal representing commanded transmission input speed;

comparing actual and commanded transmission input speeds and producing an error signal from said comparison;

producing a first control signal in response to said error signal representing the difference between commanded transmission input speed and actual transmission input speed;

producing a second control signal that increases, substantially without delay, engagement of the friction element to a degree corresponding to the size of an increase in engine torque and releases, substantially without delay, the friction element to a degree corresponding to the size of a decrease in engine torque;

summing the first and second control signals and producing a corrected control signal therefrom;

actuating the friction element by supplying said corrected control signal to the solenoid.

13. A method for controlling speed ratio changes in an automatic transmission having a friction element adapted for connection to an engine controlled by a variable position throttle, the transmission having a torque converter having an impeller adapted for connection to the engine, a turbine adapted for hydrokenetic connection to the impeller, and an electrical solenoid-operated valve communicating with the friction element, comprising the steps of:

producing pressure of variable magnitude in the friction element by opening and closing communication between a source of hydraulic pressure and the friction element in response to a signal applied to the solenoid, the friction element pressure response having a phase and gain relation to the phase and gain of said signal;

producing a signal representing throttle position;

producing a signal representing transmission actual input speed;

producing a signal representing commanded transmission input speed;

comparing actual and commanded transmission input speeds and producing an error signal from said comparison;

producing a first control signal in response to said error signal;

producing a signal representing engine torque in response to the signals representing throttle position and engine speed;

producing a signal representing transmission input torque in response to the engine torque signal;

producing a second control signal which when applied to the solenoid-operated valve changes the torque capacity of the friction element, substantially without delay, following a change in engine torque and commensurate with the magnitude of the change in engine torque;

summing the first and second control signals and producing a corrected control signal therefrom; and actuating the friction element by supplying said corrected control signal to the solenoid.

* * * * *